з,219,545
MICROBIOLOGICAL PRODUCTION OF LYSERGIC ACID DERIVATIVES

Jürg Rutschmann, Oberwil, Basel-Land, and Hans Kobel, Basel, Switzerland, assignors to Sandoz Ltd., Basel, Switzerland
No Drawing. Filed Aug. 28, 1963, Ser. No. 305,199
Claims priority, application Switzerland, Aug. 30, 1962, 10,319/62
11 Claims. (Cl. 195—81)

This invention relates to the biochemical production of lysergic acid derivatives.

The production of lysergic acid derivatives by a strain of *Claviceps paspali* Stevens and Hall has been reported (Arcamone et al., Proc. Roy. Soc., Serials B, 155, 26, 1961; Nature, 187, 238, 1960 and 188, 313, 1961; U.S. Patents 3,038,840 and 3,060,104), but the principal derivative obtained was said to be lysergic acid α-hydroxyethylamide, with relatively minor amounts of the more valuable D-lysergic acid amide and D-isolysergic acid amide (Nature 188, 313). The strain of *Claviceps paspali* used would not form conidia in vitro (proc. Roy. Soc., Serials B, 155, 33).

It has now been found that a new strain of *Claviceps paspali* Stevens and Hall, found in New Guinea in the form of sclerotica *Paspalum dilatatum* Poir., and to which has been accorded the number NRRL 3027 by the United States Department of Agriculture (Northern Utilization Research and Development Division), Peoria (Ill.), can be used to produce lysergic acid amide and isolysergic acid amide, with only minor admixture of other lysergic acid derivatives, by cultivation in a nutrient medium. It is a characteristic of this new strain that it will produce conidia when cultivated in vitro, and the use of these conidia, rather than mycelial fragments, greatly facilitates inoculation. This new strain has been deposited at the above mentioned U.S. Dept. of Agriculture.

The process of the invention, therefore, for the production of lysergic acid derivatives comprises cultivating the strain of *Claviceps paspali* Stevens and Hall, NRRL 3027, in a nutrient medium and isolating lysergic acid derivatives from the said medium.

The ready formation of conidia by the new strain confers other advantages besides ease of inoculation. Thus, single spores can be isolated by the usual techniques and genetically homogeneous material thus obtained. Moreover, it is easier to produce mutants from such spores by artificial methods, such as X-ray or ultra-violet irradiation or the use of certain chemicals, than from sterile mycelium. The conidia can be freeze-dried and thus stored indefinitely. Finally, should the strain begin to lose its vigour it can be restored by growth on Paspalum plants which may be readily infected with conidia.

The sclerotica formed by the new strain of *Claviceps paspali* Stevens and Hall on Paspalum plants contain alkaloids, unlike those formed by other strains of this fungus.

The alkaloid content of the sclerotica amounts to 0.04%, calculated on an average molecular weight of 300. The composition of the alkaloid mixture is as follows:

| | Percent |
|---|---|
| Lysergic acid amide | 40 |
| Isolysergic acid amide | 20 |
| Ergobasine | 15 |
| Ergobasinine | 10 |
| Chanoclavine | 10 |
| Unknown | 5 |

The isolation and propagation of the new strain of fungus may be carried out as follows.

A small piece of tissue is extracted under sterile conditions from the interior of a sclerotium and transferred to a beer wort agar [composition: 250 ml. of un-hopped light beer wort (solids content 17%); 18 g. of agar; distilled water to 1 liter; pH 5.2]. A circular colony develops, which reaches a diameter of 15 mm. after 14 days at 24° C. It consists of a 1 mm.-thick film of pseudosclerotial structure lying on the agar, and above this a cushion of white serial mycelium. A brown colouring substance diffuses into the agar. No conidia are formed.

This colony is divided into pieces with a spatula and transferred into a test tube with 12 cc. of the following agar nutrient medium: bear wort 500 ml., corn steep solida 60 g., lactic acid 1 ml., ammonium chloride solution to pH 4.8, agar 20 g., distilled water to 1 liter. There forms around each fragment of inoculant a small colony of initially white, and later reddish-brown, mycelium. After 10 days, conidia begin to separate off at the hyphal tips. After 20 days, sufficient conidia are present to produce therefrom an aqueous suspension with which 20 sloped agar tubules containing the same agar as above can be inoculated. These cultures are incubated at 24° C. The conidia germinate after 24–36 hours. After 6 days, the agar surface is uniformly coated with a fine white mycelium, after 10 days a brownish-grey, finely furrowed mycelium covering has formed, which lies closely on the agar and has only short serial hyphae. Conidia are formed on the latter. After 12 days, there are formed at a number of points in the mycelium, points at which small droplets of a reddish-brown liquid are precipitated. The droplets reach a diameter of 1–3 mm. and soon become cloudy from the presence of very numerous conidia. After 16–18 days, the formation of conidia has substantially ceased. A sloped agar culture in a test tube, 2 cm. in diameter and containing 12 ml. of agar substrate, contains about $10^9$ conidia.

The conidia produced in this way may be used to inoculate culture media used for the production of lysergic acid derivatives. For this purpose the submerged culture technique is preferably used.

The initial culture is first prepared as follows:

As medium, a 4.5% aqueous malt extract solution having a pH of 5.4 is employed. One liter of this solution is sterilised in a 2-liter Erlenmeyer flask for 20 minutes at 110° C., and then inoculated with about $5 \times 10^8$ conidia of a 20-day old agar culture of the new strain and incubated for 3 days at 23° C. on a rotating shaking machine. A compact culture of fine mycelium flakes is formed. The flakes consist of loose clusters of hyphae and have a diameter of 2–4 mm. No alkaloids can be detected.

Larger quantities of initial culture may be prepared in glass fermentation vessels each containing 10 liters of the same medium and inoculated with about $5 \times 10^9$ conidia. Incubation is continued for 3 days at 23° C. with aeration with 6 l. of air per minute and stirring at 200 r.p.m. In order to prevent foaming, a silicone emulsion is added. The fermentation cultures thus obtained have the same characteristics as the shake cultures.

For the main culture, the following nutrient solution, which contained in 1 liter of distilled water, 50 g. of sorbitol, 36 g. of succinic acid, 2 g. of $KH_2PO_4$, 0.3 g. of $MgSO_4$, 1 mg. of $FeSO_4 \cdot 7H_2O$ and 10 mg. of $ZnSO_4 \cdot 7H_2O$ and had been adjusted to a pH of 5.4 with $NH_4OH$, is particularly suitable.

This nutrient solution is inoculated with 10% of a 3-day old initial culture and incubated in portions of 100 ml. in 500-ml. Erlenmeyer flasks at 23° C. on a reciprocating shaking machine. A large scale culture may be grown in a similar manner in a stainless steel fermentation vessel containing 170 l. of nutrient medium. Aeration is effected with 170 l. of air per minute and stirring, initially at 70 r.p.m., and subsequently at 80 r.p.m. In order to prevent foaming, a silicone emulsion is employed.

In this way, cultures consisting of numerous mycelium particles are obtained. These particles have a diameter of about 5 mm. and have a spherical compact nucleus consisting of pseudoparenchymatous tissue about 1 mm. in diameter. This nucleus has radial extensions about 2 mm. long consisting of parallel hyphae. After culture for about 10 days, the mycelium is dark brown, and the filtrate is a dark reddish-brown. The pH varies only to a minor extent.

The isolation of the alkaloids from this culture may be effected as follows: 20 liters of the culture filtrate are brought to a pH value of 9.75 by adding 1.2 kg. of sodium carbonate. The mixture is then extracted 3 times, each time with 20 liters of ethylene chloride. The organic phase is washed with 5 liters of water and then concentrated, in a vacuum, to total of 4 liters. The concentrate is extracted 3 times, each time with 1 liter of 5% tartaric acid, the tartaric acid extracts brought to a pH value of 9.0 by the addition of sodium carbonate and then extracted 3 times, each time with 2 liters of ethylene chloride. The extracts are washed with a little water, dried over sodium sulphate, and evaporated in a vacuum. By means of investigations in accordance with Van Urk (Pharm. Weekblad 66, 473, 1929), these materials were found to contain 12.2 g. of indole compounds, whilst in accordance with paper chromatographical investigations, 11.3 g. of saponifiable indoles were found to be present.

The mixture of alkaloids so obtained has the following composition:

| | Percent |
|---|---|
| Lysergic acid amide | 45 |
| Isolysergic acid amide | 42 |
| Ergobasine | 3 |
| Ergobasinine | 3 |
| Chanoclavine | 3 |
| Elymoclavine | 2 |
| Penniclavine | 2 |

The analysis is effected by means of paper chromatography and the paper irradiated with ultraviolet light whereupon the varying intensities of the colours on the paper may be taken as a measure of the quantities of the various constituents present.

When the culture is carried out in the fermentation vessel, 145 l. of culture filtrate are obtained after culture for 12 days.

This culture filtrate is made alkaline with a 2 N sodium hydroxide solution and then extracted 5 times at a pH of 7.4 and 3 times at a pH value of 10, each time with 200 liters of ethyl acetate. The combined ethyl acetate extracts are then concentrated to 50 liters and the alkaloids removed from the concentrate with the aid of an aqueous tartaric acid solution. These aqueous extracts are made alkaline and again extracted at pH values of 7.4 and 10 with ethyl acetate. After washing until neutral with a little water, the solutions are evaporated to dryness.

112.7 g. of total alkaloids are isolated, which is equivalent to a concentration of 805 mg./l. The isolation is effected in accordance with one of the above described methods.

The alkaloid mixture has the following composition:

| | Percent |
|---|---|
| Lysergic acid amide | 66 |
| Isolysergic acid amide | 21 |
| Ergobasine | 4 |
| Ergobasinine | 2 |
| Chanoclavine | 2 |
| Elymoclavine | 2 |
| Agroclavine | 2 |
| Penniclavine | 1 |

The analysis was again effected by means of paper chromatography in the above described manner.

A further advantage of the process in accordance with the invention which utilizes the new strain NRRL 3027 resides in the fact that the resulting mixture has an especially rich lysergic acid amide and isolysergic acid amide content. In contrast to the natural ergot alkaloids, e.g. ergobasine, these compounds may be far more easily saponified to form the free lysergic acid so that the present process is particularly advantageous for the production of free lysergic acid, an important intermediate for the synthesis of highly active pharmaceuticals, since a method has been found to convert the free lysergic acid into lysergic acid chloride hydrochloride (see our U.S. Patent 3,084,164). By condensation of lysergic acid chloride hydrochloride with the corresponding amines the natural ergot alkaloids can be easily obtained as well as other physiologically active amides of the lysergic acid series (lysergic acid diethyl amide, 1-methyl-lysergic acid (+)butanolamide(2') which has become known under the trademark "Deseril"® as a strong serotonin-antagonist, useful in the treatment of migraine, allergic and rheumatic afflictions, see e.g. Diseases of the Nervous System, vol. 23, No. 10, October 1962, and Schweiz. Med. Wochenschrift, vol. 90, pp. 1040–1046, 1960).

If desired, the hydrolysis may be effected directly, together with the isolation of the alkaloid mixture from the culture filtrate, e.g. in the following manner:

The crude alkaloid mixture resulting from the above process is dissolved in a 50% ethanol solution and the alkaline solution boiled at reflux for 3½ hours after the addition of 75 g. of barium hydroxide and 2 g. of sodium dithionate. 16 ml. of concentrated ammonia and 218 ml. of 2 N sulphuric acid are added to the cooled reaction mixture. The precipitate is removed by centrifuging and the residue suspended a further 5 times, each time with 200 ml. of a warm methanol/ammonia (9:1) mixture. The combined filtrate and methanol-ammonia mixture is concentrated in a vacuum and the lysergic acid precipitated therefrom by the addition of glacial acetic acid, 12.6 g. of crude lysergic acid resulting. Recrystallization of the crude lysergic acid from 75 ml. of methanol and 25 ml. of a 2 N sodium hydroxide solution, after the addition of 33 ml. of glacial acetic acid, yields 6.3 g. of pure acid.

The influence of zinc and iron ions on the growth of the fungus and on the alkaloid content of the culture solution are given in the following two tables:

*Table I*

[Growth expressed in g./l. of dry mycelium]

| | | $FeSO_4 \cdot 7H_2O$ concentration in mg./l. | | |
|---|---|---|---|---|
| | | 0 | 1 | 10 |
| $ZnSO_4 \cdot 7H_2O$ concentration in mg./l. | 0 | 7.2 | 6.1 | 6.1 |
| | 1 | 4.2 | 11.7 | 17.1 |

*Table II*

[Alkaloid content (using 1 mg./l. of $FeSO_4 \cdot 7H_2O$ throughout]

| $ZnSO_4 \cdot 7H_2O$ in mg./l. | Alkaloid content in mg./l. |
|---|---|
| 0 | 8 |
| 1 | 1,060 |
| 15 | 985 |
| 60 | 950 |

The nutrient medium can contain up to 100 mg./litre of zinc calculated as $ZnSO_4 \cdot 7H_2O$ or up to 10 mg./litre of iron calculated as $FeSO_4 \cdot 7H_2O$, or both. It is surprising and unexpected and in contrast to prior experience that zinc and/or iron have beneficial effects on fungus growth and alkaloid production.

What is claimed is:

1. A process for the production of lysergic acid derivatives which comprises cultivating in a nutrient medium a new strain of *Claviceps paspali* Stevens and Hall in the form of sclerotica *Paspalum dilatatum* Poir. which produces conidia when cultivated in vitro, NRRL 3027, and isolating lysergic acid derivatives from the nutrient medium.

2. A process according to claim 1, in which lysergic acid amide and isolysergic acid amide are predominantly produced with only minor amounts of other lysergic acid derivatives.

3. A process according to claim 2, in which the nutrient medium is inoculated with conidia derived from the new strain, NRRL 3027.

4. A process according to claim 1, in which the nutrient medium has a pH of 5.4.

5. A process according to claim 1, in which the lysergic acid derivatives are isolated by adjusting a culture filtrate to a pH of 9.75, extracting the filtrate with an organic solvent, washing and concentrating the organic phase, extracting the concentrate with a dicarboxylic acid, adjusting the extract to pH 9.0, again extracting with an organic solvent, washing with water, drying to remove residual water and evaporating under vacuum.

6. A process according to claim 1, in which the lysergic acid derivatives are isolated by alkalinizing a culture filtrate, extracting it at pH 7.4 and then at pH 10, combining the extracts and concentrating them by reduction of volume, removing the lysergic acid derivatives from the concentrate with aqueous dicarboxylic acid solution, alkalinizing the aqueous extract thus obtained, again extracting at pH 7.4 and then at pH 10, washing and evaporating to dryness.

7. A process according to claim 1, in which the nutrient medium contains up to 100 milligrams per liter of zinc calculated as $ZnSO_4 \cdot 7H_2O$.

8. A process according to claim 1, in which the nutrient medium contains up to 10 milligrams per liter of iron calculated as $FeSO_4 \cdot 7H_2O$.

9. A process according to claim 1, in which the nutrient medium contains up to 100 milligrams per liter of zinc calculated as $ZnSO_4 \cdot 7H_2O$ and up to 10 milligrams per liter of iron calculated as $FeSO_4 \cdot 7H_2O$.

10. A process according to claim 1, in which the nutrient medium contains, for each liter of distilled water, 50 grams of sorbitol, 36 grams of succinic acid, 2 grams of $KH_2PO_4$, 0.3 gram of $MgSO_4$, 1 milligram of $FeSO_4 \cdot 7H_2O$ and 10 milligrams of $ZnSO_4 \cdot 7H_2O$ adjusted to pH 5.4 with $NH_4OH$.

11. A process according to claim 1, in which the lysergic acid derivatives are isolated and hydrolyzed by dissolving the crude mixture of lysergic acid derivatives formed in the nutrient medium in 50% ethanol solution, boiling under reflux after alkalinizing with barium hydroxide and sodium dithionate, cooling the resulting reaction mixture and adding concentrated ammonia and sulphuric acid thereto, removing the precipitate which forms by centrifuging, suspending the residue in warm 9:1 methanol/ammonia, combining the filtrate and methanol/ammonia mixture and concentrating them under vacuum and precipitating lysergic acid by adding glacial acetic acid.

References Cited by the Examiner

UNITED STATES PATENTS

| | | | |
|---|---|---|---|
| 3,038,840 | 6/1962 | Chain et al. | 195—81 |
| 3,060,104 | 10/1962 | Chain et al. | 195—81 |

A. LOUIS MONACELL, *Primary Examiner.*